Oct. 30, 1962  K. F. STROMS  3,060,773
ADJUSTABLE GUIDE BUSHING
Filed April 28, 1960  2 Sheets-Sheet 1
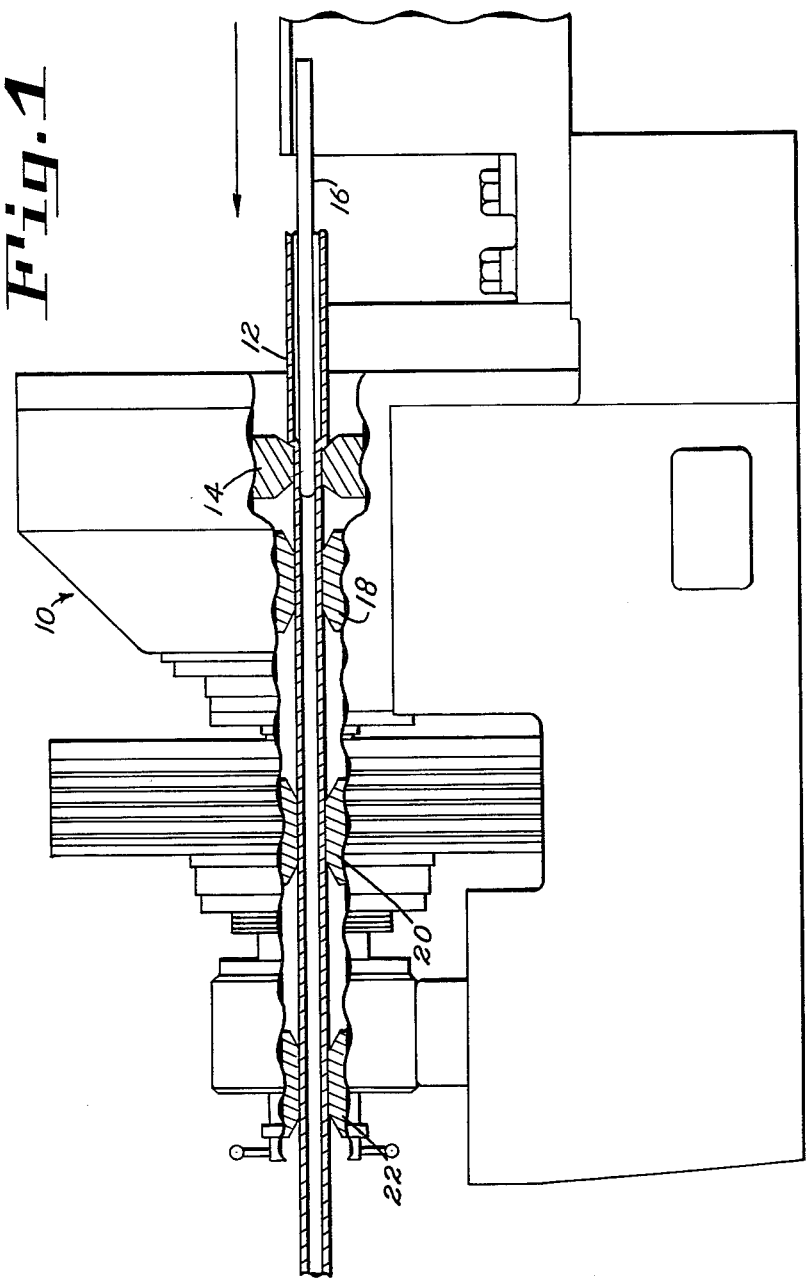
INVENTOR.
KARL F. STROMS
BY
Howard Weiser
& John F. Verhoeven
ATTORNEYS

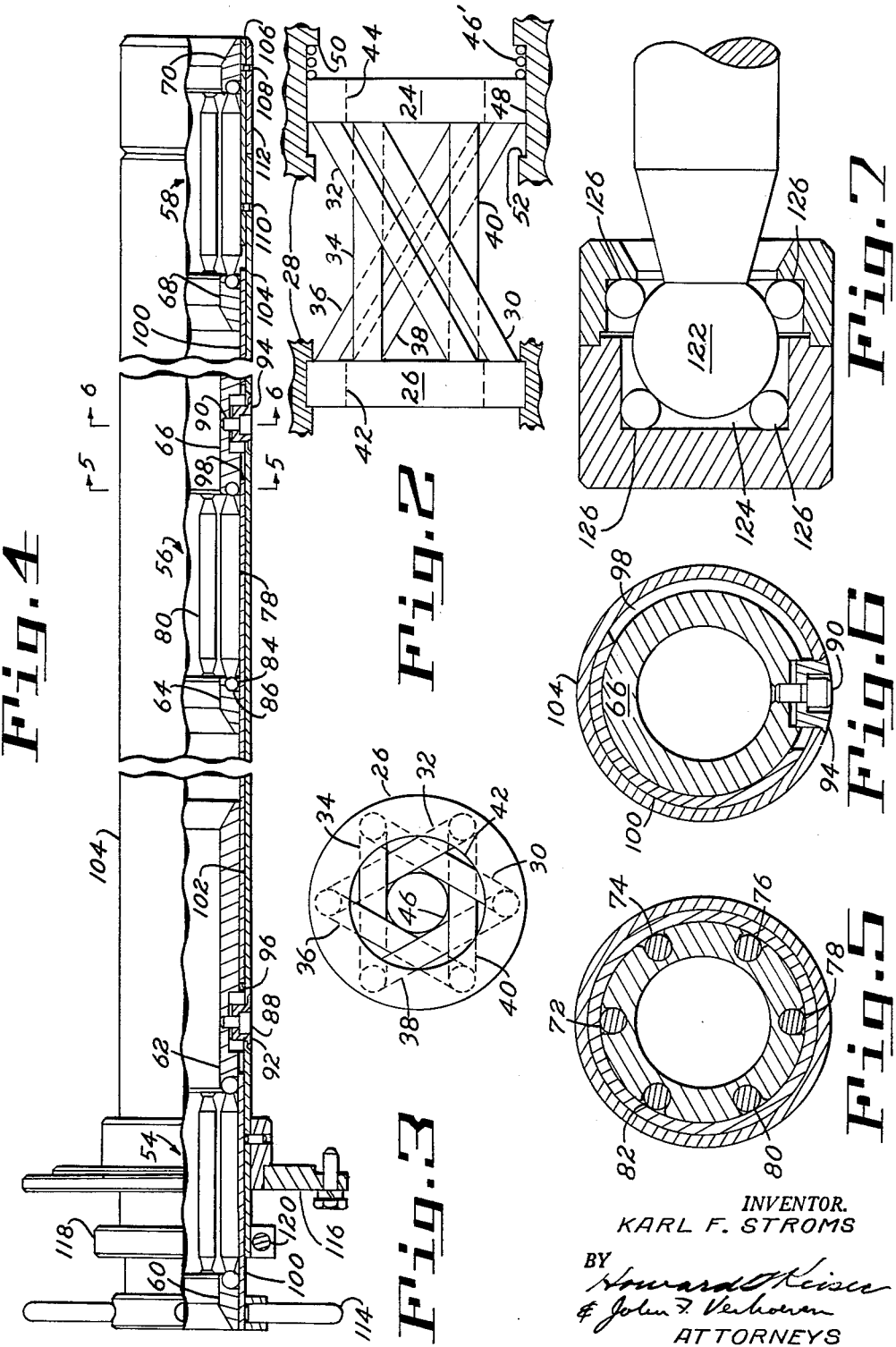

3,060,773
Patented Oct. 30, 1962

3,060,773
ADJUSTABLE GUIDE BUSHING
Karl F. Stroms, Cincinnati, Ohio, assignor to The Cincinnati Milling Machine Co., Cincinnati, Ohio, a corporation of Ohio
Filed Apr. 28, 1960, Ser. No. 25,328
6 Claims. (Cl. 78—97)

This invention relates to a bushing for guiding a moving member and is particularly suited for use with a machine tool to guide longitudinal movement of an elongated workpiece.

The operation of a machine tool in which a moving member, such as an elongated workpiece, must be guided along a predetermined line of travel has always presented difficult problems, particularly when bushings are the guide means. In order to provide accurate control of the workpiece, the bushing and workpiece must be closely matched in size. Slight variations in the size of the workpiece or in successive workpieces often cause a workpiece to stick or lodge in the machine. If the bushing is not readily accessible, as is usually the case, considerable time is required to free the workpiece from the bushing and to resume operation of the machine. Direction of members having a varying diameter, for example a tapered workpiece, is difficult to perform, and the ordinary bushing is not effective for the job. Another problem is created by the use of one machine to perform operations on workpieces which are of different size and shape. This use increases the tooling requirement for that machine since conventional bushings would have to match the size of each part to be processed.

An object of this invention is to provide a bushing with an adjustable internal size, or guide clearance, which is quickly and easily changed to accommodate various sizes of workpieces.

Another object is to provide a bushing which can automatically adjust itself for changes in size in a workpiece while accurately guiding that workpiece along a predetermined line of travel.

Still another object is to provide an adjustable bushing that may be used inside a machine and which may be adjusted in size by means having convenient location on the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A bushing constructed in accordance with the preferred form of the invention has two end members or retainers which are relatively angularly adjustable and which embrace and hold at least three guide rods in spaced relation around clearance openings in the retainers. These rods perform the guiding function and, taken as a group, define the limits within which the movable member is confined. The use of the retainers and guide rods provides an adjustable bushing which maintains a bushing guide clearance that has a fixed relationship relative to a line of travel. Rotation of the end members relative to each other in a twisting movement or angular adjustment causes the rods to change position relative to the centerline of the path of travel through the bushing. One selected rotation will cause the rods to converge toward that centerline while opposite rotation will cause the rods to diverge from that centerline. The convergence and divergence results in a corresponding change in internal size of the bushing.

A clear understanding of the operation and construction of the invention may be obtained from the following detailed description and the attached drawings in which:

FIG. 1 is an elevational view of a machine tool, partly in cross-section, having a series of adjustable bushings shown in schematic form.

FIG. 2 is a side elevation of a simplified adjustable bushing with the mounting member in partial section.

FIG. 3 is an end view of the bushing of FIG. 2.

FIG. 4 is a view, partly in cross-section, of the series of bushings in FIG. 1 and the mounting means therefor.

FIG. 5 is a section of FIG. 4 on line 5—5.

FIG. 6 is a section of FIG. 4 on line 6—6.

FIG. 7 is a detailed section of an alternate ball and socket construction.

FIG. 1 shows a machine tool 10 in which a swaging operation is performed on a workpiece 12 by action of the hammers 14 while the workpiece is forced (by means not shown) to move along a path around the mandrel 16 through the work area. The workpiece is long and cylindrical and must be removed from the work area along a predetermined path in line with the mandrel 16. Movement along that path is directed by means of adjustable bushings 18, 20 and 22 shown in schematic form in FIG. 1. These bushings are adjustable to handle various sizes of finished workpieces and to facilitate removal of a workpiece from the machine should it stick therein due to variation in dimensions in excess of allowable tolerances.

In order to best describe the adjustable bushing and its operation, reference is made first to FIG. 2 and FIG. 3 which show a single simplified adjustable bushing. The bushing is comprised of the retaining components or retainers 24 and 26, retainer 24 being movable within the mounting structure 28 both axially and angularly relative to the fixed retainer 26. Guide rods 30, 32, 34, 36, 38 and 40 are received between the retainers and are held at each end in equally spaced relationship around the center of a path of travel through the openings 42 and 44 in retainers 26 and 24 respectively. The rods are received in such a manner as to be pivotal relative to each of the retainers 24 and 26. End retainer 24 may be twisted relative to the end retainer 26, which is fixed in mounting structure 28, since they are not held relatively rigid by the rods. The bushing is shown in an adjusted position which results in a guide clearance of selected span for a cylindrical workpiece, the circular clearance indicated at 46 in FIG. 3.

As shown in FIGS. 2 and 3, the guide rods are the movement guiding members of the bushing and are obliquely oriented relative to the axis of movement which lies on the centerline of the bushing when the bushing is in the adjusted position. Adjustment of the guide clearance defined by these rods is made by relative movement of the retainers 24 and 26. If movable retainer 24 is selectively turned from the position shown in a clockwise direction as viewed from the right end in FIG. 2, the increased relative twist between retainers 24 and 26 would bring the guide rods toward the centerline of the bushing and the guide clearance would be of a smaller selected span. Selected counterclockwise rotation of retainer 24 from the position shown, as viewed from the right end in FIG. 2, would result in a guide clearance of greater selected span. The largest guide clearance available in this bushing would be limited by the openings 42 and 44 in the end members 26 and 24. FIG. 3 also shows that as few as three guide rods, for example, 30, 34 and 38, would confine movement of a cylindrical workpiece to the same path of travel. More guide rods result in a more rigid guiding structure, however. It is also evident from FIG. 3 that the guide clearance is not limited to use with cylindrical members. Such a bushing may be used to direct longitudinal movement of a member having a polygonal cross section, the number of sides determining the number of guide rods desirable.

Reference to FIG. 2 is also made to describe a self-adjusting form of the adjustable bushing. A biasing force is applied to the movable retainer 24 by spring 46' received in the recess 48 of the mounting structure 28 between the retainer 24 and end 50 of the recess 48. This spring tends to force retainer 24 toward retainer 26. In moving toward retainer 26, retainer 24 must turn in angular adjustment relative to the retainer 26, resulting in a change in guide clearance. If no workpiece extends through the bushing, the clearance closes until movement of the retainer 24 is stopped by the end 52 of the recess 48. If a workpiece extends through the bushing, the bushing adjusts itself until all guide rods contact the workpiece and then the workpiece itself limits the guide clearance. A force pushing a workpiece of increasing diameter through the bushing opposes the guide rod converging effect of the bias spring 46' and causes the bushing to open to a larger size to accommodate the increased diameter. As the bushing guide clearance is changed, the center of the path of travel nevertheless remains the same through the bushing. Should the diameter of the workpiece become smaller, the spring would bias the bushing to decrease its internal span to keep the guide rods in contact with the workpiece. The same self-adjusting result is provided if the bias applied to retainer 24 is a rotating force tending to rotate retainer 24 relative to retainer 26. The axial dimensions of recess 48 are such that the movable retainer never can move to a position in either extreme of axial movement at which the forces tending to adjust the bushing are not effective upon the bushing.

Reference is now made to FIG. 4, FIG. 5, and FIG. 6 which show an in-line combination of three simultaneously adjustable guide bushings 54, 56, and 58, such as are represented schematically in FIG. 1 by 22, 20, and 18 respectively. Each of the bushings 54, 56, and 58 is made up of a pair of axially spaced annular retaining components or retainers 60 and 62, 64 and 66, 68 and 70. One retainer 62, 66, and 70 of each pair is fixed. The other retainer, 60, 64, and 68 of each pair is movable. Received between the retainers of each pair are six guide rods 72, 74, 76, 78, 80, and 82 shown prior to adjustment in the position of maximum span therebetween. The rods have ball ends 84 received in ball sockets 86 in the retainers and are pivotal therein. Two fixed retainers (62, 66) are attached to the housing by pins 88 and 90 and plugs 92 and 94 respectively through clearance openings 96 and 98 in the wall of sleeve 100 which is received in the bore 102 of housing 104 and is selectively angularly and axially movable therein. The third fixed retainer is attached by pins (not shown) to spacer 106 pinned at 108 and 110 to housing extension 112 and housing 104. Each movable retainer is fixed to the sleeve 100 by pins (not shown) for selective movement therewith. Simultaneous adjustment of the bushings is made by rotating the handwheel 114 which is fixed on the end of sleeve 100. This angularly and axially moves sleeve 100 relative to the housing 104, which is bolted through flange 116 to the machine tool, and a relative twist or rotation is effected in each pair of retainers. This rotation causes the guide rods of each bushing to converge from the maximum span position toward the axis through the center of the in-line bushings 54, 56, and 58. When a predetermined guide clearance is defined by the guide rods, the locking collar 118 is tightened by bolt 120 and sleeve 100 and housing 104 are locked together making the bushings rigid.

FIG. 7 shows an alternate construction for joining the guide rods in the retainers. The ball end 122 is received in a socket cavity 124 in the retainer and is held therein by antifriction balls 126 which are spaced around the ball end to provide for easy movement of the rod relative to the retainer contributing to ease of adjustment. It also enables the rods to rotate freely about their longitudinal axis. Axial movement of the workpiece through the bushing in oblique contact with the guide rods tends to rotate those rods. If the rods are free to rotate, wear of each rod is reduced by the rolling action of the rod relative to the workpiece. In addition, the wear is distributed around the periphery of the rod and not localized at one point.

What is claimed is:
1. A bushing having a guide clearance comprising two spaced apart retaining components each having an opening therethrough and at least three sockets spaced around said openings, one of said components rotatable relative to the other, at least three rods pivotally received at one end in said sockets of one component and at the other end in the sockets of the other component, said rods defining a guide clearance of maximum span when said retaining components are in a predetermined angular relation and converging as one of said components is rotated relative to the other, and means selectively to adjust the angular position of said one component relative to the other whereby said rods define a guide clearance of selected span.

2. A bushing having a guide clearance to receive a movable member comprising, two spaced apart retaining components spaced along a center axis each having an opening therethrough on said axis, each of said retaining components having at least three sockets in a plane normal to said axis and equally spaced on a circle having its center on said axis, one of said components rotatable relative to the other, guide rods each having ball ends and received at one end in said sockets of one component and at the other end in the sockets of the other component, said rods cooperatively defining a guide clearance about said axis in a plane between said retaining components variable in accordance with the angular rotation of said one component relative to the other, and means selectively to adjust the angular position of said one component relative to the other to effect engagement of the rods with the movable member for guidance thereof.

3. A bushing having a guide clearance to receive a movable member comprising, two spaced apart retaining components along a center axis, each having an opening therethrough on said axis, each of said retaining components having at least three sockets in a plane normal to said axis and equally spaced on a circle having its center on said axis, each socket having antifriction balls therein, one of said components rotatable relative to the other, guide rods each having ball ends and received at one end by the said antifriction balls in said sockets of one component and at the other end in the sockets of the other component, said rods cooperatively defining a guide clearance about said axis in a plane between said retaining components variable in accordance with the angular rotation of said one component relative to the other, and means selectively to adjust the angular position of said one component relative to the other to effect engagement of the rods with the movable member for guidance thereof.

4. A bushing having a clearance to receive a movable member and automatically adjustable to accommodate the size of said member comprising two spaced apart retaining components along a center axis, each having an opening therethrough on said axis, each of said retaining components having at least three sockets in a plane normal to said axis and equally spaced on a circle having its center on said axis, one of said components rotatable relative to the other and one of said components movable axially relative to the other, guide rods of equal predetermined length each having ball ends and received at one end in said sockets of one component and at the other end in the sockets of the other component, said rods cooperatively defining a guide clearance about said axis in a plane between said retaining components, the span of said clearance determined by the relative angular relation between said retaining components and the axial spacing between said retaining components, and means to bias at least one of said retaining components relative to the other to adjust the span of said clearance to effect engagement of the rods with said member for guidance thereof.

5. In a machine tool adapted to receive an elongated movable member on a longitudinal axis, the combination of a plurality of pairs of spaced retaining components longitudinally and axially spaced along said axis, each of said retaining components having an opening therethrough larger than said member and one retaining component of each pair rotatable relative to the other retaining component of the pair, at least three rods extending between the retaining components of each pair and pivotally received at each end therein spaced around the openings thereof, said rods engaging the member to define a guide therefor when said one retaining component is in predetermined angular relation to the other retaining component of the pair, and means selectively to adjust the angular position of said rotatable retaining components of all the pairs to provide longitudinally spaced guides for the movable member.

6. In a machine tool adapted to receive an axially movable elongated cylindrical member, the combination of a housing connected to said machine tool having a cylindrical bore therethrough, an axially movable and angularly rotatable sleeve received in said bore having a plurality of axially spaced openings through the wall thereof, a plurality of pairs of spaced retaining components axially spaced in said sleeve, each of said retaining components having an opening therethrough larger than said member, each of said pair comprising a fixed retaining component connected through one of said sleeve openings to the housing and a movable retaining component connected to the sleeve for rotation and axial movement therewith, at least three guide rods extending between the retaining components of each pair and pivotally received at each end therein equally spaced around the openings thereof, the rods of all pairs defining longitudinally and axially spaced like guide clearances and said rods engaging the movable member for guidance thereof when the movable retaining components are in a predetermined angular and axial relation to the fixed retaining components, and means to secure said sleeve relative to the housing to hold said movable retaining components in said predetermined angular and axial relation to said fixed retaining components.

References Cited in the file of this patent
UNITED STATES PATENTS
1,958,845  Burns _____ May 15, 1934